United States Patent
Guzik

[11] Patent Number: 5,872,451
[45] Date of Patent: Feb. 16, 1999

[54] SYSTEM FOR LOCATING AND FIXING A HEADSTACK ASSEMBLY ON HEADSTACK TESTER

[75] Inventor: Nahum Guzik, Palo Alto, Calif.

[73] Assignee: Guzik Technical Enterprises, San Jose, Calif.

[21] Appl. No.: 854,122

[22] Filed: May 9, 1997

[51] Int. Cl.[6] .......................... G01R 33/12; G11B 5/455; G11B 5/56
[52] U.S. Cl. .......................... 324/212; 324/262; 360/109
[58] Field of Search .......................... 324/202, 210–212, 324/261, 262; 29/593; 360/75, 105, 109; 369/55, 57

[56] References Cited

U.S. PATENT DOCUMENTS

| | | |
|---|---|---|
| 3,678,219 | 7/1972 | Dennis . |
| 3,933,247 | 1/1976 | Smith .................... 324/211 X |
| 4,430,614 | 2/1984 | Gereg .................... 324/262 X |
| 5,491,413 | 2/1996 | Guzik .................... 324/212 |
| 5,517,111 | 5/1996 | Shelor .................... 324/202 |
| 5,589,771 | 12/1996 | Chur .................... 324/212 |

*Primary Examiner*—Gerard Strecker
*Attorney, Agent, or Firm*—Lappin & Kusmer LLP

[57] ABSTRACT

A method and a system for fixing and positioning a headstack (100, 200, 300, 400) on a headstack tester by utilizing a vacuum chuck (105, 106, 208, 310). The vacuum chuck engages headstack. This engagement determines the exact position of the magnetic heads (24a, 24b . . . ) supported by the headstack with respect to the working surfaces (S1, S2, S3) of magnetic disks ((111a, 111b, 111c) of the disk pack of the tester.

17 Claims, 4 Drawing Sheets

FIG. 7 ures of disks. In the embodi-
SYSTEM FOR LOCATING AND FIXING A HEADSTACK ASSEMBLY ON HEADSTACK TESTER

BACKGROUND—FIELD OF THE INVENTION

The invention relates to testing of components of hard drives for computers, and, specifically, it deals with a system for locating and fixing a headstack, which is a part of a hard disk assembly, in a headstack tester.

BACKGROUND—PRIOR ART AND ITS DRAWBACKS

Modern computers have hard drives that are made in the form of a headstack and a stack of hard disks. A headstack is an assembly including a plurality of read and write heads, which are stacked in such a manner as to work in conjunction with the pack of hard disks, which are used for data storage. These devices are well known and are used in many data storage applications. The headstacks are manufactured by many companies such as SAE Magnetic, Read-Rite, IBM, Seagate, and others.

The headstack is generally mounted on a shaft by means of bearings. This arrangement allows the headstack to rotate freely on the shaft, because during data storage operations (reading and writing), the magnetic heads have to be turned on the shaft to position them with respect to the hard disks.

The headstacks have to be tested after manufacturing and before integration into hard drives. This testing process involves the use of a special test apparatus that has a movable mounting plate (for positioning the headstack in a plane parallel to the working surface of the disk (hereinafter referred to as an X-Y plane) with the headstack fixing mechanism installed on this plate for rigidly supporting the headstack to be tested.

To be tested, the headstack should be mounted on the aforementioned mounting plate of the tester in such a manner as to simulate the operating conditions for the headstack in a disk drive unit. This includes the accuracy requirements regarding the position of the headstack with respect to the pack of magnetic disks. In fact, the accuracy of the positioning of the headstack on the tester involves the following three criteria: position of the headstack with respect to the disks along the axis perpendicular to the working surfaces of the disks (hereinafter referred to as a Z--axis position); angular position of the headstack with respect to the mounting plate; and a coordinate position of the headstack with respect to the mounting plate on a plane parallel to the surfaces of the disks (X-Y position).

Various companies manufacture headstacks of different designs and test them at different stages of manufacturing. For example, some headstacks are tested with the bearings and shaft installed inside them and others are tested without these parts. The shaft can have a male threaded extension, a female thread, a through opening, etc. The choice of components and mounting is made by the manufacturer. It will be apparent that headstacks to be tested are available in a large variety of forms, including different degrees of completeness and different mounting methods, i.e., ways of fixing the headstack to the mounting plate of the tester.

The variety of forms and methods of fixation introduces certain problems in fixing the headstack to the mounting plate of the tester. In other words, there are no universal tooling and mounting methods for the fixation of headstacks on the testers, so that various adapters and fixtures have to be used for each specific application.

Figure 1:
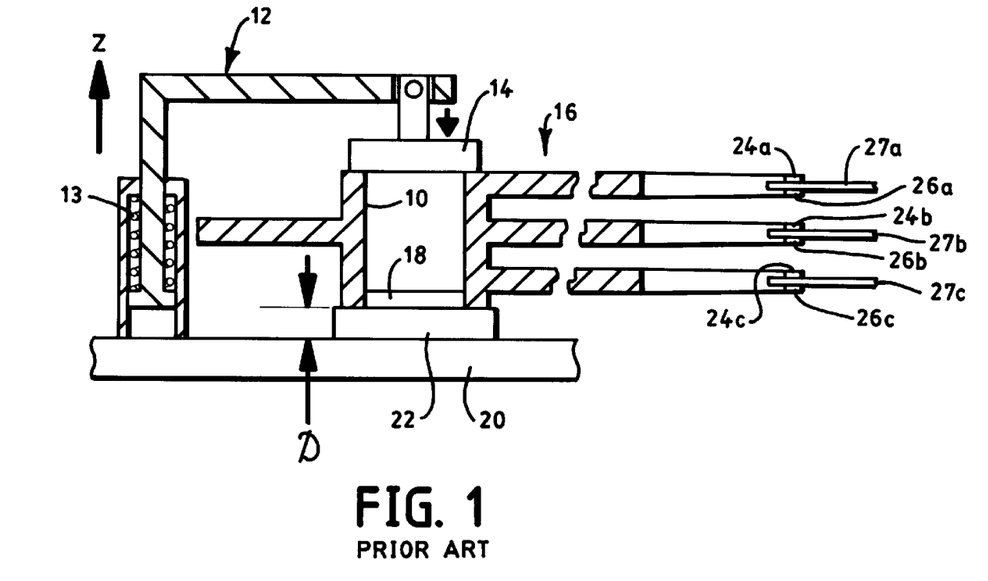
FIG. 1 illustrates a prior-art system for fixation of a headstack with a through mounting opening and without a shaft and bearings.

In general, at the present time two main systems are used for fixating and locating headstacks on a tester: a system for fixing a headstack with a through opening and a system for fixing a headstack with a bearing shaft. In the prior art system of the type shown in FIG. 1, where the headstack has a through opening 10, the tester is equipped with a pivotal arm 12 which is spring-loaded by a compression spring 13 in the Z-axis direction and supports a pusher 14 that normally is pushed in a downward direction. In order to install a headstack 16 for testing on a tester, it is fitted on a positioning member, e.g., a positioning post 18 attached to the mounting plate 20 and having a flange 22, having thickness D, that defines an exact position of magnetic heads with respect to the working surfaces of disks. In the embodiment of FIG. 1, three magnetic heads 24a, 24b, and 24c, engage upper working surfaces of disks 27a, 27b, and 27c, and three magnetic heads 26a, 26b, 26c engage lower working surfaces of disks 27a, 27b, and 27c. Mounting plate 20 has been moved to a position that defines exact coordinate of the headstack in the horizontal plane, i.e., an X-Y plane, and the angular position of headstack 16 is also fixed using appropriate stops (not shown). Then pusher 14 is lifted, pivotal arm 12 is turned to a position aligned with the headstack, and the pusher is released so it presses against the upper surface of headstack 16 to hold it in place and in a fixed position for testing.

A disadvantage of this system is that it is complicated in construction and inconvenient in use. Furthermore, the force of pusher 14 is applied against mounting plate 20, and this may buckle the headstack and cause instability in its position.

Figure 2:
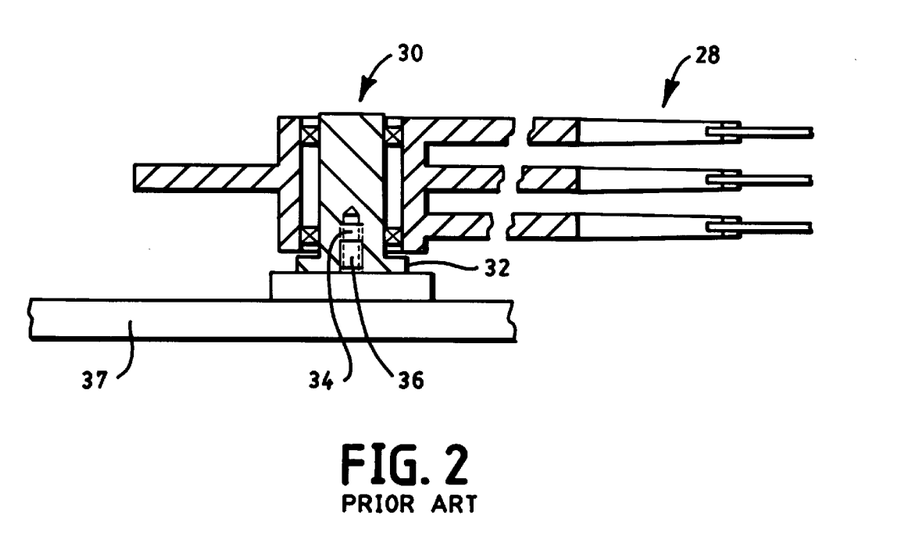
FIG. 2 illustrates a prior-art system for fixation of a headstack with a bearing shaft.

In accordance with a system of the type shown in FIG. 2, which is used for locating and fixing a headstack 28 with a bearing shaft 30, a pusher is not required, and a construction element of the shaft is used for positioning and fixing the headstack in a position required for testing. For example, shaft 30 may have a flange 32 with a threaded opening 34 (or a threaded projection on flange 32) for engagement with a threaded projection 36 directly on a mounting plate 37 or on a adapter plate the thickness of which determines the Z-position of the headstack. The position of the threaded connection on the mounting plate determines the X-Y positioning of headstack 28 on the tester.

A disadvantage of this system is that providing the threaded connection with a threaded element on a tester, i.e., on the mounting plate, is time-consuming, and the time taken away from the testing operation is very expensive. Furthermore, the thread cannot provide accurate X-Y positioning.

OBJECTS OF THE INVENTION

It is accordingly an object of the invention to provide an improved system for headstack testing and to provide such a system for fixing the headstack to a mounting plate of a headstack tester without application of any compression forces that may cause buckling or instability in the position of a headstack on a headstack tester. Another object is to provide a headstack testing system that ensures quick, convenient, and efficient positioning and fixation of the headstack on a tester.

Further objects and features of the invention will become apparent from the ensuing description with the accompanying drawings.

SUMMARY OF THE INVENTION

The invention provides a method and a system for fixing and positioning a headstack on a headstack tester by utilizing a vacuum chuck having a positioning surface and a support surface. The positioning surface of the vacuum chuck engages a positioning surface of the headstack, i.e., the surface of the headstack used for positioning the headstack in the disk drive. This engagement determines the exact position of the magnetic heads supported by the headstack with respect to the working surfaces of magnetic disks of the disk pack of the tester (X-Y plane position). The support surface of the vacuum chuck engages a reference surface of the headstack which in a disk drive is used for determining the Z-coordinate position of the headstack. The engagement of the reference surface of the headstack with the supporting surface of the vacuum chuck is used for sealing the vacuum chamber of the vacuum chuck, as well as for determining the Z-coordinate position of the headstack with respect to the disks of the disk pack.

If the headstack has a through opening where the cross-sectional area of the opening is sufficient to generate a reliable holding force for holding the headstack in the fixed position, the headstack is used as it is, i.e., without an adapter. The open end of the headstack opening is closed with a sealing plug. If the cross-section of the headstack opening is insufficient for developing a reliable vacuum holding force, the headstack is equipped with an adapter in the form of two pieces interconnected through the headstack opening so that the headstack is squeezed between the two pieces. One of the pieces has the aforementioned reference and positioning surfaces for engagement with respective supporting and positioning surfaces of the vacuum chuck.

The vacuum positioning and fixation system ensures a quick, uniform, reliable, and convenient positioning and fixation of the headstack and does not cause any buckling or instability in the position of the headstack during testing.

DESCRIPTION OF THE PREFERRED EMBODIMENTS

Figure 3:
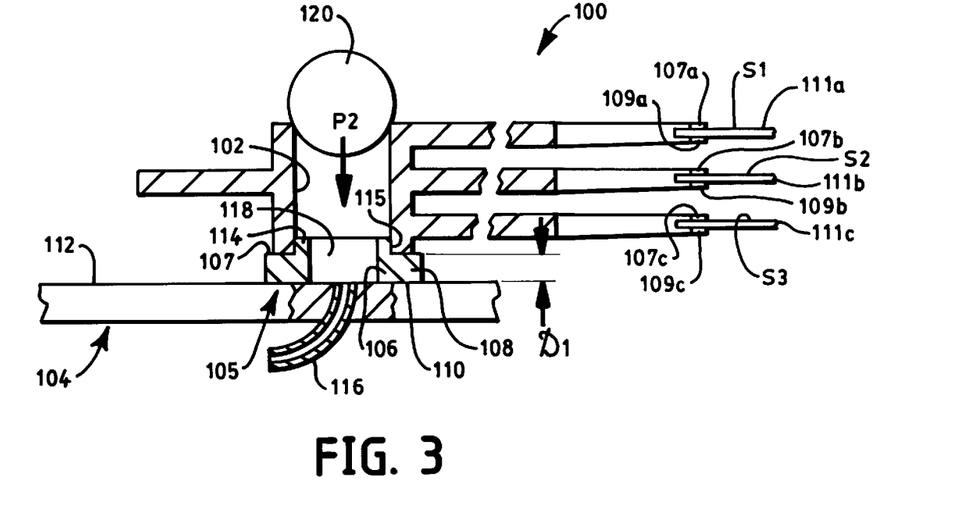
FIG. 3 illustrates a system of the invention for vacuum fixation of a headstack with a through mounting opening and without a shaft and bearings.
Figure 4:
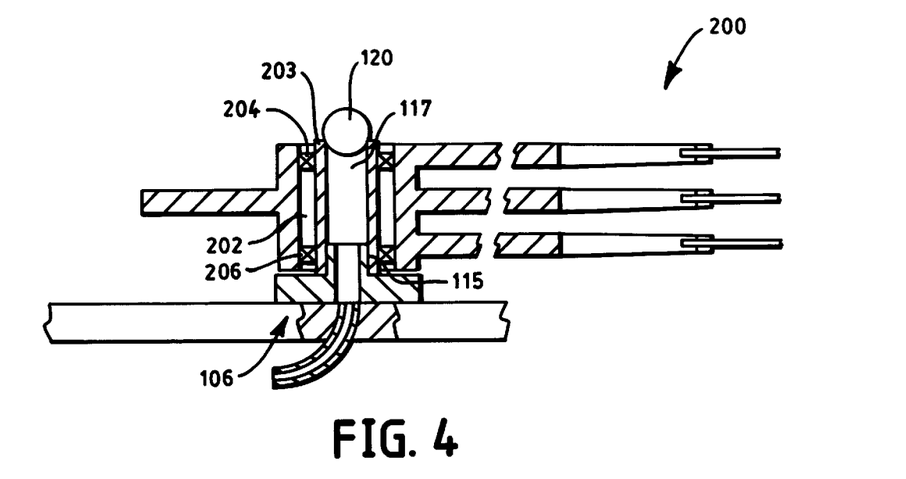
FIG. 4 illustrates a system of the invention for vacuum fixation of a headstack with a through opening having bearings installed in the aforementioned opening.
Figure 5:
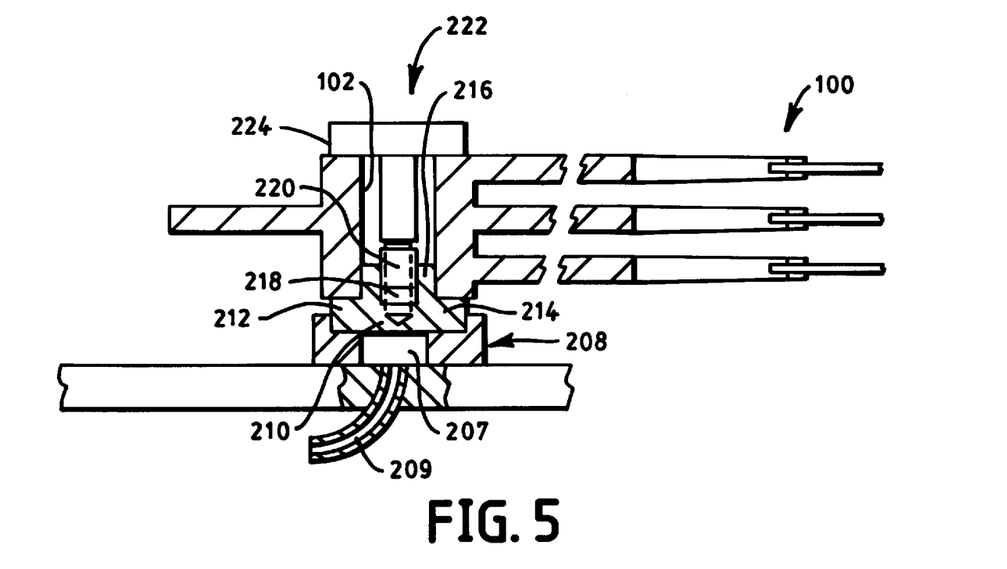
FIG. 5 illustrates a system of the invention for vacuum fixation of a headstack preassembled with an adapter.

FIGS. 3, 4, and 5—Fixation of Headstack With Through Opening

FIG. 3 illustrates a system of the invention for vacuum fixation of a headstack 100 without a bearing, i.e., with a through opening 102, to a mounting plate 104 of a headstack tester (not shown). In this embodiment, a bushing 106 is rigidly attached to mounting plate 104 by any conventional means (not shown). Headstack 100 supports a plurality of magnetic heads 107a, 107b, 107c, 109a, 109b, 109c for engagement during testing with respective magnetic disks 111a, 111b, 111c having working surfaces S1, S2, S3. For the sake of clarity of the drawing, the working surface of the disks are shown and designated for only one side of each disk. Such surfaces may, however, be on both sides of the disk for engagement with magnetic heads located beneath respective disks). Headstack 100 is rotationally supported by a spindle (not shown) of the tester. The magnetic heads, magnetic disks, and mechanisms of the tester for linearly and angularly positioning the heads with respect to the disks are well known, so will neither be shown nor described.

Bushing 106 has a flange portion 108, the lower surface 110 of which is sealed against a mating surface 112 of mounting plate 104, and a sleeve portion 114 with an outer cylindrical reference surface 115. The latter is used as a positioning surface of the vacuum chuck 105 formed by bushing 106 for centering headstack 100 when headstack 100 is fitted with its opening 102 on outer cylindrical surface 115. Opening 102 functions as a positioning surface for headstack 100. The outer cylindrical surface 115 of bushing 106 has a clearance fit with the surface of opening 102 so that both surfaces determine accurate positioning of the headstack in an X-Y plane.

The lower end face of headstack 100 functions as the headstack reference surface. It rests against the upper surface 107 of flange portion 108 with a sealing contact. Surface 107 serves as a support surface of the chuck or bushing 106, and this ensures proper vertical position of the headstack (Z-position) in which the magnetic heads of the headstack are positioned for proper engagement with the working surfaces of the disks, as will be described below.

A passage 116 is connected to a source of vacuum (not shown) formed in mounting plate 104 and is open into a space defined by opening 102 and an open interior region 118 of bushing 106. In the context of the present invention, the term "vacuum" means a reduced pressure of air which is within the range of 500 to 700 Torrs. The aforementioned space, which functions as a vacuum cavity, may be sealed by a plug, e.g., in the form of a ball 120 seated as a ball valve in a seat formed by the upper edge of opening 102.

In order to fix headstack 100 for testing on mounting plate 104, headstack 100 is positioned on mounting plate 104 by fitting its opening 102 on outer cylindrical surface 115, and the space formed by opening 102 and the interior region 118 of bushing 106 are sealed by a ball-like plug 120. A vacuum is then generated in the aforementioned space, whereby plug 120 is pulled with a uniform force P2 toward its seat surface. At the same time, headstack 100 is sealingly pressed with a uniform fixation force against upper surface 107 of flange portion 108.

As a result, the headstack is fixed without any deformations or distortions that could be caused by an externally applied force.

It is understood that, similar to any prior-art system, in this and in subsequent embodiments of the system, the headstack has to be fixed so that it is installed precisely at a predetermined height that ensures proper engagement of magnetic heads with respective magnetic disks. On the other hand, irrespective of whether the headstack has a shaft with the bearing or whether it has an opening without a bearing, during testing the headstack has to be fixed against rotation around the shaft or around the bushing of the mounting plate.

In the embodiment of FIG. 3, the first requirement, i.e., the exact position of the heads with respect to the disks (not shown) is achieved by properly selecting the thickness of bushing flange 108, more specifically the dimension D1 shown in FIG. 3. The second requirement is achieved by means of a special fixation mechanism of a tester which is beyond the scope of the present invention and therefore is not shown. These requirements are equally applicable to all subsequent embodiments of the invention and therefore will not be further repeated.

FIG. 4 illustrates a system for the fixation of a headstack 200 with a through opening 202 but with a spindle 203 that supports ball bearings 204 and 206 installed into opening 202. This system is practically the same as the one shown in FIG. 3, with the exception that outer cylindrical surface 115 of bushing 106 is inserted into an opening 117 of bearing spindle 203. The system uses same ball-like plug 120 and operates in the same manner as the system of FIG. 3.

FIG. 5 illustrates another embodiment of a system for the fixation of a headstack 100 of FIG. 3. The system utilizes a bushing 208 with an adapter 210 which is preassembled with headstack 100. An interior region 207 of bushing 208 is connected via a channel 209 with a source of vacuum (not shown). Adapter 210 consists of a flange portion 212 which has an outer diameter suitable for fitting into a recess 214 of bushing 208 and a small-diameter cylindrical portion 216 sealingly insertable into opening 102 of headstack 100. A blind threaded opening 218 is formed in the end face of adapter 210 on the side of small-diameter portion 216. Threaded opening 218 is used for engaging a threaded projection 220 formed on the end of a block 222. This block has a flange 224 of a diameter greater than the diameter of opening 102. Thus when projection 220 is screwed into opening 218, to the extent that the lower face of flange 224 comes into contact with the surface of headstack 100, the latter is firmly squeezed between adapter 210 and block 222.

The preassembled unit consisting of a headstack 100, adapter 210, and sealing block 222 is then fixed for testing on a headstack tester (not shown) in the same manner as a headstack assembly with a solid shaft. In other words, flange portion 212 of adapter 210 is inserted into recess 214 of bushing 208, and then vacuum is induced in an interior 207 of bushing 208 via channel 209. As a result, the force developed by vacuum fixes the preassembly in the tooling of the tester.

Figure 6:
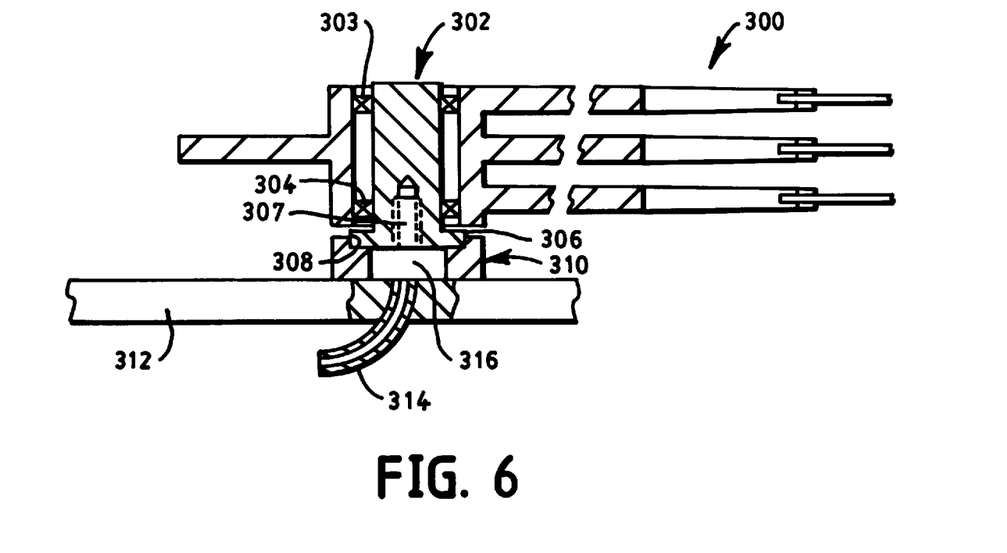
FIG. 6 illustrates a system of the invention for vacuum fixation of a headstack with bearing shaft having a blind threaded opening in the shaft flange.
Figure 7:
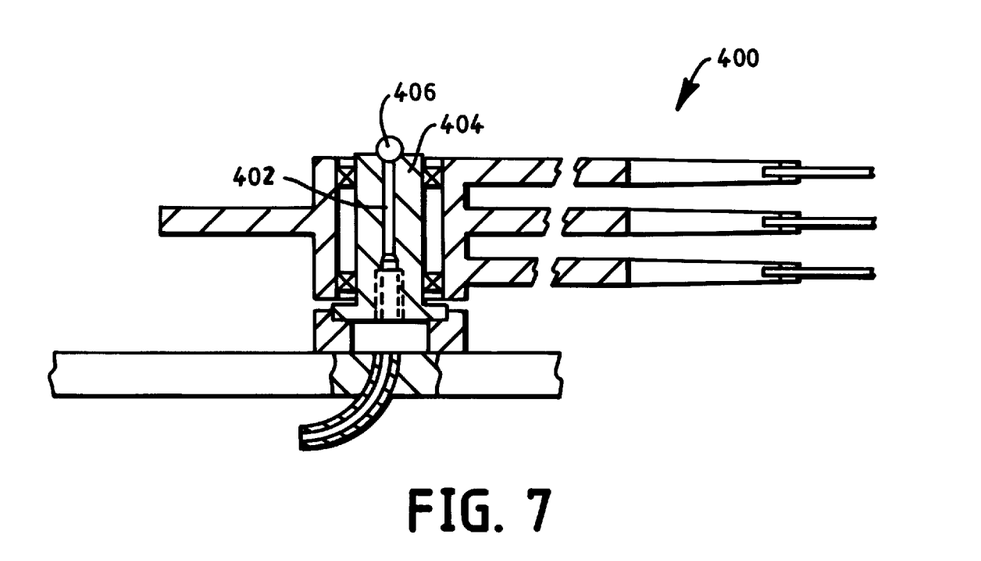
FIG. 7 shows a headstack with a bearing shaft having a through opening.

FIGS. 6, 7—Fixation of a Headstack With a Shaft and Ball Bearings

FIG. 6 illustrates a system of the invention for vacuum fixation of a headstack 300 with a shaft 302 supported by ball bearings 303 and 304 installed into the headstack opening. Shaft 302 has a flange 306 on the end that protrudes from headstack 300. Flange 306 has a blind threaded opening 307 for attachment of headstack 300 to a respective disk drive (not shown). An outer cylindrical surface of flange 306 is used as a positioning surface that engages the inner circumferential surface of a recess 308 formed in a bushing 310 for accurately positioning headstack 300 in the X-Y plane. Bushing 310 is rigidly and sealingly attached to a mounting plate 312 of a headstack tester (not shown). A passage 314 which is connected to a source of vacuum (not shown) is formed in mounting plate 312 and is open into an interior 316 of bushing 310.

In order to fix headstack 300 for testing on mounting plate 312, the headstack is installed into bushing 310 by fitting the outer cylindrical surface of flange 306 into a recess 308. Interior 316 of bushing 310 which in this position is sealed by shaft flange 306, is evacuated via passage 314. The force developed by vacuum and applied from inside the bushing to the surface of shaft flange 306 firmly holds headstack 300 in place during testing. Since threaded opening 307 is a blind opening, the presence of this opening does not affect the vacuum.

As a result, the headstack is fixed without any deformations or distortions that could be caused by an externally applied force.

The system shown in FIG. 7, a headstack 400 has a through opening 402 in a shaft 404. The is essentially the same as the one of FIG. 6, but it requires additionally the use of a plug, e.g., a ball-like plug 406. The principle of operation remains the same as for the case of fixation of headstack 300 of FIG. 6.

Conclusions, Ramifications, Scope

Thus it has been shown that the method and the system of the invention make it possible to accurately position the heads of the headstack with respect to the magnetic disks of the tester and to fix the headstack to the mounting plate of a headstack tester without application of any compression forces that may cause buckling or instability in the position of a headstack on a headstack tester. The system of the invention ensures quick, convenient, and efficient positioning and fixation of the headstack on a tester.

Although the invention has been shown and described with reference to specific embodiments, it is understood that these embodiments should not be construed as limiting the scope of application of the invention. For example, plug 120 of FIG. 3 may have a conical shape rather than a ball-like configuration, shaft 302 of FIG. 6 may have a threaded projection rather than blind threaded opening 307, materials, sizes, shapes, methods of attachment of parts can be varied. Therefore many modifications and changes of the illustrated embodiments are possible. Thus the scope of the invention should be determined by the appended claims and their legal equivalents and not the examples given.

I claim:

1. A method for locating and fixing a headstack assembly having plurality of magnetic heads in a testing position on a headstack tester having a plurality of magnetic disks engaging said magnetic heads, said headstack assembly having a reference surface and a positioning surface, comprising the steps of:

providing said tester with a vacuum chuck for fixing said headstack assembly in said headstack tester with the use of a force developed by vacuum, said vacuum chuck having a vacuum cavity for connection to a source of vacuum, a positioning surface and a support surface;

providing said headstack assembly with means for positioning said headstack assembly in said vacuum chuck so that said magnetic heads of said headstack assembly are arranged in an accurate X-Y plane position with respect to said magnetic disks of said tester as required for testing; and with means for accurate Z-direction positioning of said magnetic heads of said headstack assembly perpendicular to said X-Y plane position with respect to said magnetic disks of said tester as required for testing;

engaging said positioning means of said headstack assembly with said positioning surface of said vacuum chuck and sealingly engaging said means for accurate Z-direction positioning of said headstack with said support surface of said vacuum chuck for at least partially sealing said vacuum cavity of said vacuum chuck; and inducing vacuum in said vacuum cavity with the use of said source of vacuum for developing said force for fixing said headstack assembly in said testing position.

2. The method of claim 1 wherein:

said headstack assembly has a through opening extending in said Z-direction, a first face surface located on one side of said opening and perpendicular to said Z-direction and a second face surface parallel to said first face surface and located on an opposite side of said opening;

said vacuum chuck is made in the form of a bushing having a flange portion and a sleeve-like portion, said vacuum chuck being attached to a moveable mounting plate of said headstack tester and being capable of moving linearly and rotationally for positioning said magnetic heads in said accurate X-Y plane position;

said means for positioning said headstack assembly in said vacuum chuck being said through opening of said headstack assembly being; a said positioning surface of said vacuum chuck being an outer surface of said sleeve-like portion;

said reference surface of said headstack being said second face surface of said headstack;

said vacuum chuck further including an additional sealing means which seals said vacuum chuck from said one side of said opening.

3. The method of claim 2 wherein said additional sealing means is a sealing plug which sealingly engages the edged of said through opening on said one side of said opening.

4. The method of claim 1 wherein:

said headstack assembly has a through opening extending in said Z-direction;

a hollow bearing spindle that has an inner surface, one end face and another end face opposite to said first end face, said hollow bearing spindle supporting ball bearings on its outer surface, said bearings being inserted into said through opening;

said vacuum chuck is made in the form of a bushing having a flange portion and a sleeve-like portion, said sleeve portion being inserted into said hollow bearing spindle;

said vacuum chuck being attached to a moveable mounting plate of said headstack tester and being capable of moving linearly and rotationally for positioning said magnetic heads in said accurate X-Y plane position;

said means for positioning said headstack assembly in said vacuum chuck being said inner surface of said hollow bearing spindle; said positioning surface of said vacuum chuck;

said positioning surface of said vacuum chuck being said outer surface of said sleeve-like portion;

said reference surface of said headstack being said another end face of said hollow bearing spindle;

said vacuum chuck further including an additional sealing means which seals said vacuum chuck from said one side of said opening.

5. The method of claim 4 where said additional sealing means is a sealing plug which sealingly engages the edged of said through opening on said one side of said opening.

6. The method of claim 1 wherein said headstack assembly has a through opening extending in said Z-direction, a first face surface located on one side of said opening and perpendicular to said Z-direction and a second face surface parallel to said first face surface and located on an opposite side of said opening;

said vacuum chuck is made in the form of a bushing having a recess, said vacuum chuck being attached to a moveable mounting plate of said headstack tester and being capable of moving linearly and rotationally for positioning said magnetic heads in said accurate X-Y plane position;

said means for positioning said headstack assembly in said vacuum chuck being made in the form of an adapter which consists of a first adapter part which is located on the side of said first face surface and a second adapter part which is located on the side of said second face surface, said first adapter part and said second adapter part being interconnected through said through opening;

said second adapter part having a flange portion with an end surface and an outer cylindrical surface, said outer cylindrical surface of said flange portion being said positioning surface of said headstack assembly;

said end surface of said flange portion being said reference surface of said headstack;

said positioning surface of said vacuum chuck being the walls of said recess;

said means for accurate Z-direction positioning of said magnetic heads being said flange portion.

7. The method of claim 1 wherein said headstack assembly has a bearing shaft installed on bearings in said through opening of said headstack, said bearing shaft having a flange portion projecting from said through opening, said flange portion having an outer cylindrical portion, said vacuum chuck being made in the form of a bushing having a recess, said recess having an inner cylindrical surface and a flat surface, said inner cylindrical surface being said positioning surface of said vacuum chuck, and said support surface of said vacuum chuck being said flat surface.

8. A method for locating and fixing a headstack assembly having plurality of magnetic heads in a testing position on a headstack tester having a plurality of magnetic disks engaging said magnetic heads, said headstack assembly having a through opening, a reference surface and a positioning surface, comprising the steps of:

providing said tester with a vacuum chuck for fixing said headstack assembly in said headstack tester with the use of a force developed by vacuum, said vacuum chuck having a vacuum cavity connected to a source of vacuum, a positioning surface, and a support surface;

providing said headstack assembly with a first adapter part and a second adapter part;

squeezing said headstack assembly between said first adapter part and said second adapter part by interconnecting said first adapter part with said second adapter part via said through opening, said second adapter part being made in the form of a cylindrical insert having a flange portion that is located outside said through opening and a smaller diameter cylindrical part which is inserted into said through opening with a clearance fit, said flange portion having an outer surface and an end face, said outer surface of said flange portion being said positioning surface of said headstack assembly which engages said positioning surface of said vacuum chuck, and said end face surface being said reference surface of said headstack assembly that engages said support surface of said vacuum chuck;

engaging said positioning surface of said headstack assembly with said positioning surface of said vacuum chuck and sealingly engaging said end face of said flange portion with said support surface of said vacuum chuck; and inducing vacuum in said vacuum cavity with the use of said source of vacuum for developing said force for fixing said headstack assembly in said testing position.

9. A system for locating and fixing a headstack assembly in a testing position on a headstack tester, said headstack assembly including a plurality of magnetic heads, and said headstack tester having a plurality of magnetic disks, each having at least one working surface in an X-Y plane, whereby said magnetic heads are opposite said working surfaces of said magnetic disks, comprising:

A. A vacuum chuck having a vacuum cavity therein connected to a source of vacuum, for fixing said headstack assembly on said headstack tester with the use of a force developed by vacuum in said cavity;

B. A moveable plate of said headstack tester which supports said vacuum chuck and which is capable of moving in an X-Y plane for positioning said vacuum chuck and said headstack assembly which is fixed to said vacuum chuck, so that said magnetic heads of said headstack assembly are arranged in an X-Y plane with respect to said magnetic disks of said tester; and C. Means for positioning said headstack assembly in a Z-direction, which is perpendicular to said X-Y plane, said vacuum chuck being located at a level in said Z-direction that provides positioning of said magnetic heads of said headstack assembly in said Z-direction as required for testing.

10. The system of claim 9 wherein:

said headstack assembly has a through opening extending in said Z-direction, a first face surface located on one side of said opening and perpendicular to said Z-direction and a second face surface parallel to said first face surface and located on an opposite side of said opening;

said vacuum chuck is made in the form of a bushing having a flange portion and a sleeve-like portion, said vacuum chuck being attached to a moveable mounting plate of said headstack tester and being capable of moving linearly and rotationally for positioning said magnetic heads in said accurate X-Y plane position;

said positioning surface of said headstack assembly for positioning said headstack assembly in said vacuum chuck being said surface of said through opening of said headstack assembly;

said positioning surface of said vacuum chuck being said outer surface of said sleeve-like portion;

said reference surface of said headstack being said second face surface of said headstack;

said vacuum chuck further including an additional sealing means which seals said vacuum chuck from said one side of said opening.

11. The system of claim 10 wherein said additional sealing means is a sealing plug which sealingly engages the edged of said through opening on said one side of said opening.

12. The system of claim 9 wherein:

said headstack assembly has a through opening extending in said Z-direction;

a hollow bearing spindle that has an inner surface, one end face and another end face opposite to said first end face, said hollow bearing spindle supporting ball bearing on its outer surface, said bearings being inserted into said through opening;

said vacuum chuck is made in the form of a bushing having a flange portion and a sleeve-like portion, said sleeve portion being inserted into said hollow bearing spindle;

said vacuum chuck being attached to said moveable plate of said headstack tester and being capable of moving linearly and rotationally for positioning said magnetic heads in said accurate X-Y plane position;

said positioning surface of said headstack assembly for positioning said headstack assembly in said vacuum chuck being said inner surface of said hollow bearing spindle;

said positioning surface of said vacuum chuck being said an outer surface of said sleeve-like portion;

said reference surface of said headstack being said another end face of said hollow bearing spindle;

said vacuum chuck further including an additional sealing means which seals said vacuum chuck from said one side of said opening.

13. The system of claim 12 wherein said additional sealing means is a sealing plug which sealingly engages the edged of said through opening on said one side of said opening.

14. The system of claim 9 wherein said headstack assembly has a through opening extending in said Z-direction, a first face surface located on one side of said opening and perpendicular to said Z-direction and a second face surface parallel to said first face surface and located on an opposite side of said opening;

said vacuum chuck is made in the form of a bushing having a recess, said vacuum chuck being attached to said moveable mounting plate of said headstack tester and being capable of moving linearly and rotationally for positioning said magnetic heads in said accurate X-Y plane position;

means for positioning said headstack assembly in said vacuum chuck made in the form of an adapter which consists of a first adapter part which is located on the side of said first face surface and a second adapter part which is located on the side of said second face surface, said first adapter part a and said second adapter part being interconnected through said through opening;

said second adapter part having a flange portion with an end surface and an outer cylindrical surface, said positioning surface of said headstack assembly being said outer cylindrical surface of said flange portion;

said reference surface of said headstack being said end surface of said flange portion;

the walls of said recess being said positioning surface of said vacuum chuck;

said flange portion being said means for accurate Z-direction positioning of said magnetic heads.

15. The system of claim 9 wherein said headstack assembly has a bearing shaft installed on bearings in said through opening of said headstack, said bearing shaft having a flange portion projecting from said through opening, said flange portion having an outer cylindrical portion, said vacuum chuck being made in the form of a bushing having a recess, said recess having an inner cylindrical surface and a flat surface, said inner cylindrical surface being said positioning surface of said vacuum chuck, and said flat surface being said support surface of said vacuum chuck.

16. The system of claim 15 wherein said bearing shaft has a through opening, and wherein said vacuum chuck further includes an additional sealing means for sealing said through opening of said bearing shaft from the side opposite to said vacuum chuck.

17. A system for locating and fixing a headstack assembly having plurality of magnetic heads in a testing position on a headstack tester having a plurality of magnetic disks engaging said magnetic heads, said headstack assembly having a through opening, a reference surface and a positioning surface, said system comprising:

a moveable plate of said head tester, said moveable plate being moveable in an X-Y plane for accurately positioning said vacuum chuck and hence said headstack assembly installed in therein with respect to said magnetic disks in said testing position;

a vacuum chuck attached to said moveable plate and intended for fixing said headstack assembly in said headstack tester with the use of a force developed by vacuum, said vacuum chuck having a vacuum cavity connected to a source of vacuum, a positioning surface and a support surface;

a first adapter part and a second adapter part for squeezing said headstack assembly therebetween and means for interconnecting said first adapter part with said second adapter part via said through opening, said second adapter part being made in the form of a cylindrical insert having a flange portion that is located outside said through opening and a smaller diameter cylindrical part which is insertable into said through opening with a clearance fit, said flange portion having an outer surface and an end face, said outer surface of said flange portion being said positioning surface of said headstack assembly which engages said positioning surface of said vacuum chuck, and said end face surface being said reference surface of said headstack assembly that engages said support surface of said vacuum chuck;

said positioning surface of said headstack assembly being engageable with said positioning surface of said vacuum chuck and said end face of said flange portion being sealingly engageable with said support surface of said vacuum chuck.

* * * * *